R. BULLYMORE.
PROCESS AND APPARATUS FOR TREATING LARD.

No. 178,269.  Patented June 6, 1876.

Witnesses:
C. J. Buchheit
C. J. Baker

Richard Bullymore, Inventor
By Edward Wilhelm
Attorney.

UNITED STATES PATENT OFFICE.

RICHARD BULLYMORE, OF BUFFALO, NEW YORK.

IMPROVEMENT IN PROCESSES AND APPARATUS FOR TREATING LARD.

Specification forming part of Letters Patent No. 178,269, dated June 6, 1876; application filed April 17, 1876.

*To all whom it may concern:*

Be it known that I, RICHARD BULLYMORE, of the city of Buffalo, in the county of Erie and State of New York, have invented certain new and useful Improvements in Process and Apparatus for Treating Lard, which improvements are fully set forth in the following specification, reference being had to the accompanying drawing.

In the manufacture of lard it is of importance to separate from the lard, after it leaves the rendering-tank, the water and impurities which it contains.

The object of my invention is to purify, bleach, dry, and cool the rendered lard in a more expeditious and perfect manner than it is possible with the methods and appliances heretofore employed for the purpose.

The nature of my invention will be fully understood from the following description.

Figure 1:
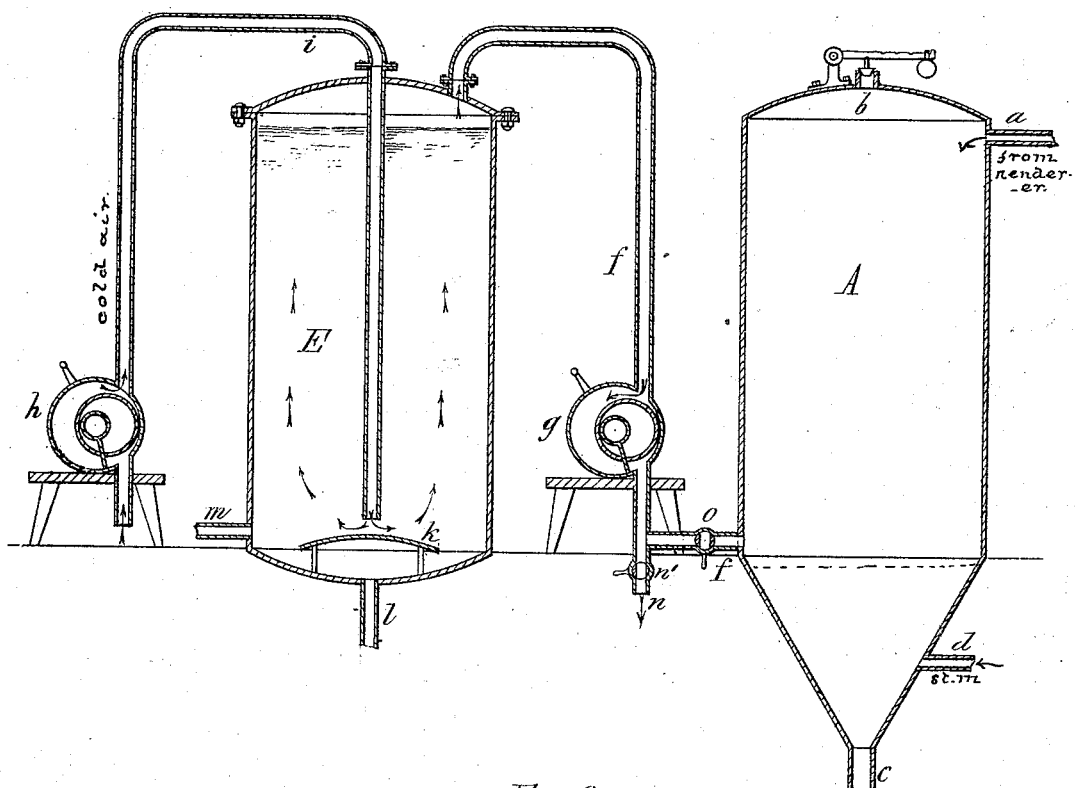
Figure 2:
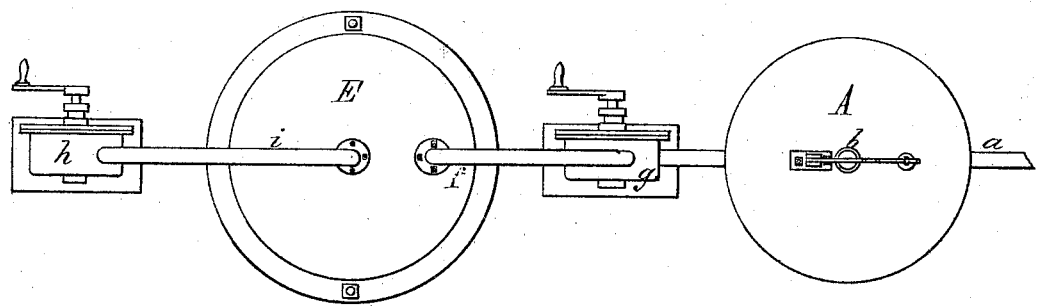

In the accompanying drawing, Figure 1 is a sectional elevation, and Fig. 2 a plan view, of my improved apparatus for treating lard.

Like letters of reference refer to like parts in each of the figures.

A represents the purifying-tank, consisting of a closed vessel, into which the liquid lard is discharged from the rendering-tank by a pipe, $a$. $b$ is an opening formed in the upper part of the tank A, and preferably provided with a safety-valve so constructed that it will blow off at a pressure of about five pounds to the square inch. The bottom of the tank A is preferably made funnel-shaped or tapering, and provided at its lowest point with a discharge-pipe, $c$. $d$ is a pipe entering the lower portion of the tank A, for admitting steam to the same. E represents the cooling-tank, being also a closed vessel, into which the purified lard is discharged from the tank A by a pipe, $f$, entering the tank E at its top.

The tank E may be arranged below the tank A, so that the liquid lard may be run directly into the same from the tank A; or the tanks A and E may be arranged side by side, and the liquid lard pumped from the tank A into the tank E by means of any suitable pump, $g$.

$h$ represents an air force-pump, centrifugal fan, or other suitable blower; and $i$, the discharge-pipe thereof, entering the top of the tank E, and descending therein to within a short distance from the bottom thereof. $k$ represents a deflecting plate or disk arranged between the bottom of the tank E and the end of the pipe $i$. $l$ represents a water-discharge pipe arranged in the bottom of the tank E below the deflector $k$, and $m$ the lard-discharge pipe, arranged in the side of the tank E. The suction-pipe of the pump $g$ is provided with a branch, $n$, having a stop-cock, $n'$, and with a stop-cock, $o$, arranged between the branch $n$ and the tank A.

The lard, as it comes from the steam rendering-tank, contains a greater or less quantity of water and various impurities, which have to be completely separated from the lard, in order to produce a fine article.

The liquid lard is run from the steam rendering-tank into the purifying-tank A, containing a weak solution of sal-soda, made in the proportion of about three or four ounces of sal-soda to a gallon of water. The quantity of solution employed is so regulated that the level of the solution before the lard is introduced will be slightly below the pipe $f$, where it connects with the tank A. When the tank A is filled to within a short distance from its top the pipe $a$ is closed by a suitable stop-cock, and the steam admitted to the tank A through the pipe $d$. The steam, in rising through the liquid contained in the tank A, heats the same to a temperature corresponding with the pressure which the safety-valve at $b$ permits to be carried, and at the same time agitates the liquid and thoroughly mixes the solution of sal-soda with the liquid lard, bringing the solution in intimate contact with all parts of the lard, and enabling the solution to combine with the impurities contained therein.

When the material in the tank A has been so heated and agitated for a sufficient length of time, say from two to five minutes, or until the steam escapes from the safety-valve, the steam is shut off, when the liquid contained in the vessel A will immediately pass from an agitated state into a state of complete rest, which permits the solution of sal-soda to settle in the lower portion of the tank, carrying the impurities and water contained in the lard with it, as the oily consistency of the lard at this high temperature permits a speedy and complete separation of the water from the lard, leaving the lard dry. The latter is now drawn off through the pipe $f$, and pumped into the tank E, while the residue is discharged from the tank A through the pipe $c$. The cock $o$ is now closed and the cock $n'$ opened, when the blower $h$ is set in motion, so as to force a current of cold air through the liquid lard contained in the tank E, while the pump $g$ is revolved in a reversed direction, so as to exhaust from the tank E the air which has become heated in its passage through the lard. By this means the heat is rapidly abstracted from the lard, and the latter reduced in a very short time to a creamy consistency, the rapid cooling of the lard while in agitation insuring a fine and even grain thereof.

The exhaust, in removing the heated air from the tank E directly as it issues from the lard, expedites the cooling process, and at the same time prevents any vapors from condensing on the upper walls of the tank E.

The deflector $k$ spreads the downward air-current laterally, and prevents the liquid lard under the deflector from being agitated, thereby permitting any water which accidentally may have been pumped over into the tank E, to settle under the deflector $k$, whence it can be drawn off by the pipe $l$. The lard, after being cooled to the desired degree, is discharged from the tank E through the pipe $m$.

When no reversible pump $g$ is employed to transfer the lard from the purifying-tank to the cooling-tank a separate exhaust-fan will be used for removing the hot air from the tank E.

In some cases the lard may, for convenience, be discharged from the tank A into an ordinary flat tank, and thence be pumped into the cooling-tank, when the same results will be obtained.

The lard treated, as hereinbefore described, in closed vessels is kept free from dust, insects, and other impurities, thereby producing an article of great purity, and of a fine and even grain.

In warm weather the suction-pipe of the blower $h$ may be connected with a suitable ice-house or other refrigerating apparatus, in which the air is cooled to the required temperature previous to forcing it through the lard.

I am aware that lard has been treated previous to my invention with a solution of sal-soda, and this I do not broadly claim; but

What I claim as my invention is—

1. The process of treating liquid lard with a solution of sal-soda while a current of steam is forced through the liquid, and allowing the mass to settle while at a high temperature, for separating the impurities and water from the lard, substantially as hereinbefore set forth.

2. The combination, with the purifying-vessel A, provided with steam-pipe $d$, of the cooling-vessel E, connecting-pipe $f$, blower $h$, and air-pipe $i$, substantially as and for the purpose hereinbefore set forth.

3. The combination, with the tight cooling-vessel E, of the blower $h$, air-pipe $i$, and exhaust $fg$, substantially as and for the purpose hereinbefore set forth.

4. The combination, with the purifying-vessel A and cooling-vessel E, of the connecting-pipe $f$, reversible pump $g$, branch pipe $n$, and stop-cocks $n'$ $o$, substantially as and for the purpose hereinbefore set forth.

5. The combination, with the cooling-vessel E, blower $h$, and descending air-pipe $i$, of the deflecting-plate $k$, substantially as and for the purpose hereinbefore set forth.

RICHARD BULLYMORE.

Witnesses:
EDWARD WILHELM,
CHAS. J. BUCHHEIT.